United States Patent [19]
Morris

[11] 3,749,948
[45] July 31, 1973

[54] PRESSURE TRANSDUCER
[75] Inventor: Harold B. Morris, Houston, Tex.
[73] Assignee: Seismic Logs, Inc., Houston, Tex.
[22] Filed: June 21, 1971
[21] Appl. No.: 155,099

[52] U.S. Cl.................... 310/9.4, 310/8.6, 340/10
[51] Int. Cl............................................ H04r 17/00
[58] Field of Search.......................... 310/8, 8.1, 8.3, 310/8.6, 9.1, 9.4; 340/10, 17; 179/110 A

[56] References Cited
UNITED STATES PATENTS

| | | | |
|---|---|---|---|
| 3,555,503 | 1/1971 | Morris | 340/10 X |
| 3,489,997 | 1/1970 | Morris | 340/17 X |
| 3,150,347 | 9/1964 | Hanish | 310/8.6 X |
| 3,113,288 | 12/1963 | Snavely | 340/10 |
| 3,360,665 | 12/1967 | Boswell | 310/8.6 X |
| 3,187,300 | 6/1965 | Brate | 340/10 |
| 3,002,179 | 9/1961 | Kuester | 310/8.6 X |

*Primary Examiner*—J. D. Miller
*Assistant Examiner*—Mark O. Budd
*Attorney*—Richards, Harris & Hubbard

[57] ABSTRACT

A pressure transducer comprises a cylindrical housing, a damping compound filling the housing and two sets of opposed dished piezoelectric crystals mounted at axially spaced points in the housing and surrounded by the compound. The adjacent crystals of the sets are rigidly interconnected and the crystals are electrically connected such that outputs caused by changes in pressure are added and outputs caused by accelerations are cancelled. Pressure waves are admitted to the housing by way of apertures formed in the ends of the housing and diaphragms extending over the apertures and contacting the damping compound.

11 Claims, 3 Drawing Figures

PATENTED JUL 31 1973 3,749,948

INVENTOR:
HAROLD B. MORRIS

Richards Harris & Hubbard
ATTORNEY

PRESSURE TRANSDUCER

BACKGROUND AND SUMMARY OF THE INVENTION

This invention relates to a pressure transducer, and more particularly to a pressure transducer incorporating piezoelectric crystals.

U. S. Pat. No. 3,489,997, granted to Harold B. Morris on Jan. 13, 1970, relates to an accelerometer comprising a rigid case, a fluid filling the case, and two sets of opposed dished crystals mounted within the case and surrounded by the fluid. The crystals are of the type that produce an electrical output in response to mechanical strain, i.e., piezoelectric crystals, and are electrically interconnected in such a way that outputs from the crystals caused by changes in pressure within the case are cancelled. The electrical connections between the crystals also cause a reinforced output in response to vibrations of the case, particularly vibrations of the type encountered in seismic exploration, etc.

The present invention comprises a pressure transducer constructed similarly to the accelerometer disclosed in the above-identified Morris Patent, but wherein the sets of opposed dished crystals are rigidly interconnected by a rod and wherein both ends of the case are provided with diaphragms so that external pressure waves are transmitted to the crystals. The crystals are electrically interconnected such that outputs caused by simultaneous motion of both sets of crystals in the same direction, i.e., outputs caused by vibrations of the case, are cancelled. On the other hand, outputs caused by simultaneous motion of the sets of crystals in opposite directions, i.e., outputs caused by changes in pressure within the case, are arithmetically added by the electrical connections between the crystals.

DESCRIPTION OF THE DRAWING

A more complete understanding of the invention may be had by referring to the following Detailed Description when taken in conjunction with the accompanying drawing, wherein.

DETAILED DESCRIPTION

Figure 1:
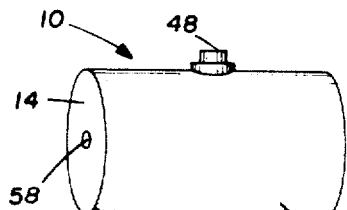
FIG. 1 is a reduced perspective view of a pressure transducer comprising the preferred embodiment of the invention.
Figure 2:
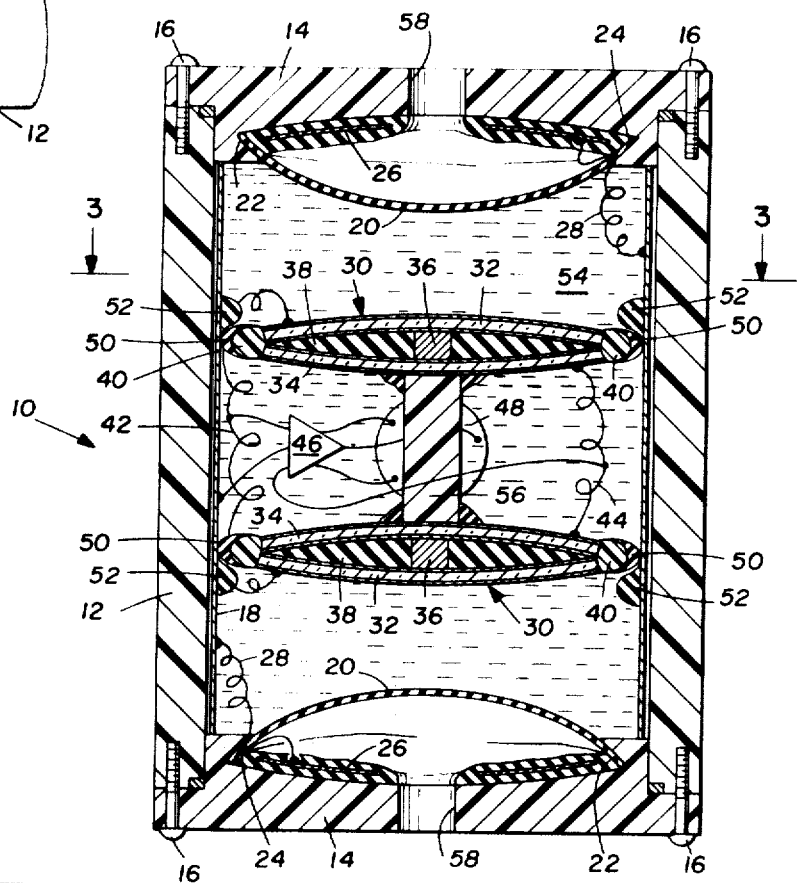
FIG. 2 is a longitudinal sectional view of the pressure transducer shown in FIG. 1.

Referring now to the drawing, and particularly to FIG. 2, there is illustrated a pressure transducer 10 comprising the preferred embodiment of the invention. The pressure transducer 10 includes an outer cylindrical case 12 formed from an insulating type material, such as plastic. The case 12 is provided with end caps 14 which are secured by screws 16. The screws 16 are preferably secured by a suitable bonding material, such as epoxy.

A thin-wall cylinder 18 is mounted within the case 12 and is formed from an electrical conductor. The cylinder 18 is abutted against the end caps 14 and is therefore secured against axial movement relative to the case 12. The cylinder 18 comprises an electrostatic shield and is preferably secured to the case 12 by a suitable bonding material.

The end caps 14 are each closed by a diaphragm 20. More particularly, each cap is provided with a silicone rubber diaphragm 20 which is mounted in a dished groove 22 formed in the end cap 14 and which has edges 24 that extend into the apex of the groove 22. A metallic washer 26 is molded into a portion of each diaphragm 20 and serves to secure the diaphragm in its end cap 14 and to extend the electrostatic shield around substantially the entire interior of the case 12. It will be noted that a conductor 28 interconnects the cylinder 18 and each washer 26. For very high frequency applications of the invention the silicone rubber diaphragms 20 may be replaced with metal diaphragms which are secured to the end caps 14.

The pressure transducer 10 further comprises two sets of opposed dished crystals 30. Each crystal set 30 comprises an outer crystal 32 and an inner crystal 34. Each crystal set further includes a small metal disk 36 positioned between the crystals 32 and 34, an annulus of a nonconductive material 38 which extends around the disk 36 and a ring of nonconductive bonding material 40 which secures the outer peripheries of the crystals 32 and 34 in contact with one another. The crystal sets 30 are preferably formed by securing a metal disk to one surface of a crystal with a conductive adhesive such as silver epoxy, and then covering the remainder of the surface with a nonconductive adhesive, such as epoxy. A nonconductive cement is then applied to the periphery of the crystal and a second crystal is positioned in contact with the metal disk and the nonconductive adhesive. The peripheries of the crystals are then held in contact so that the nonconductive cement is forced outwardly to form an outer ring. Excess cement is removed from the ring before the cement is allowed to cure.

It will be understood that the foregoing assembly procedure produces a slight bowing of the crystals 32 and 34 of each crystal set 30. This bowing is greatly exaggerated for the sake of clarity in FIG. 2 in that in actual practice the crystals 32 and 34 of each set have a diameter of about 1.75 inches whereas the metal disk 36 has a thickness of between about 0.002 inches and about 0.008 inches depending on the requirements of a particular application of the invention. The bowing of the crystals produces a preloading which is highly advantageous in the pressure transducer 10. It will be further understood that each crystal set 30 may comprise stacks of two or more crystals on each side of the metal disk 36. Such a construction is advantageous in that it results in both a further preloading of and an increased voltage output from the crystals.

The crystals employed in the crystal set 30 of the pressure transducer 10 are of the type that generate an electric signal when subjected to a mechanical strain, i.e., piezoelectric crystals. It is preferable that the crystals be nonhydroscopic. Typical examples of crystals that have been found to be satisfactory for use in the present invention and their Curie points are:

barium titanate, Curie point 120° C;

lead titanate — lead zirconate, Curie point 300° C. — 365° C.; and sodium potassium niobate, Curie point 300° C.

Figure 3:
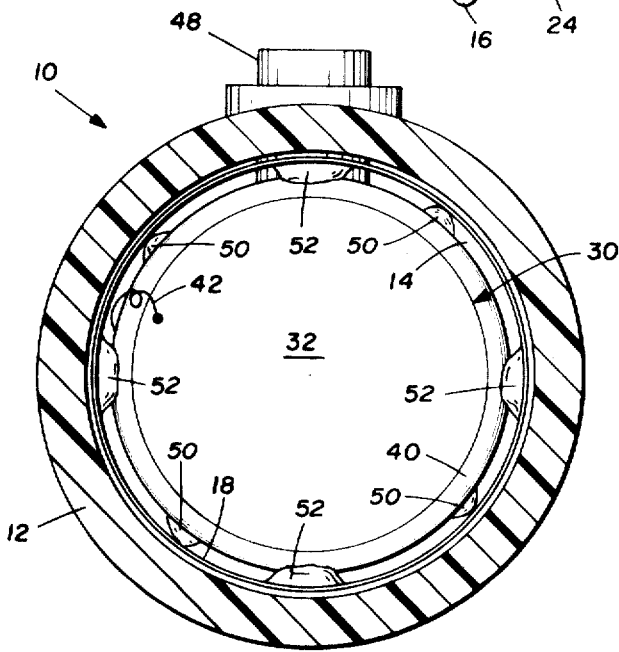
FIG. 3 is a sectional view taken generally along the line 3—3 in FIG. 2.

By way of example, the pressure transducer 10 may comprise lead-zirconate — lead titanate crystals having a thickness of about 0.01 inch. Both faces of each crystal are silvered and the crystals are assembled as shown in FIG. 2 with the negative sides of the crystals adjacent in the assembly. The inner and outer crystals 32 and 34 of the crystal sets 30 are then interconnected by leads 42 and 44, respectively, and the leads are directed out of the case 12 through an amplifier 46 and a plug 48. The amplifier 46 is preferably a wide band amplifier of the type shown in FIG. 3 of the above-identified Morris Patent.

The crystal sets 30 of the pressure transducer 10 are positioned in the cylinder 18 and hence in the case 12 by a plurality of nubs 50. As is clearly shown in FIGS. 2 and 3, three or four nubs 50 are positioned around the periphery of each crystal set 30. The nubs 50 are preferably formed by applying small mounds of silicone rubber to spaced points around the rings of cement 40 of the crystal sets 30. After the silicone rubber has cured, the crystal sets 30 are positioned within the cylinder 18. Additional mounds of silicone rubber are then applied to the interior of the cylinder 18 at points on opposite sides of the crystal sets 30. This forms a plurality of nubs 52 which locate and retain the crystal sets 30. On the other hand, it will be understood that the peripheries of the crystal sets 30 are not actually bonded to the cylinder 18 as is the case in the accelerometer disclosed in the above-identified Morris Patent.

After the crystal sets 30 have been mounted in the case 12, the interior of the case 12 is filled with a suitable damping compound 54. In accordance with the preferred embodiment of the invention, the damping compound 54 comprises a silicone liquid such as the type manufactured and sold by the Dow Corning Corporation and identified as Dow Corning III Compound or the type manufactured and sold by the General Electric Company and identified as Inculgrease G640. However, in accordance with the particular requirements, the damping compound may comprise silicone oil (less damping, mercury (high sensitivity), etc.

The pressure transducer 10 illustrated in the drawing differs from the accelerometer disclosed in the above-identified Morris Patent principally in that the inner crystals 34 of the crystal sets 30 are interconnected by a rigid rod 56. The rod 56 is preferably formed from rigid plastic, or the like, and is secured to the crystals 34 by suitable adhesive, such as epoxy. Also, apertures 58 extend through the end caps 14 and into communication with the interiors of the diaphragms 20. By this means, external pressure is applied to both ends of the interior of the case 12.

Operation

In use, the pressure indicator 10 is placed in a fluid environment so that fluid enters the interiors of the diaphragms 20 through the apertures 58. Because the inner crystals 34 of the crystal sets 30 are interconnected by the rod 56, the crystal sets 30 respond in an equal and opposite manner to changes in pressure within the case 12. More particularly, pressure waves in the fluid enter the case 12 and engage the crystal sets 30 simultaneously. Since the inner crystals 34 are secured to one another by the rigid rod 56, any such pressure wave causes equal and opposite flexures of the peripheries of the crystal sets 30. Due to the electrical inner connections between the crystals 32 and 34 as provided by the leads 42 and 44, the differential change in configurations of the crystal sets produces an electrical output which is arithmetically added. This output is amplified by the amplifier 46 and is directed out of the pressure transducer 10 through the plug 48.

The operation of the pressure transducer 10 in detecting pressure waves is enhanced by the portion of the damping compound located between the crystal sets 30. By this means a hydraulic spring action is obtained which greatly increases the sensitivity of the pressure transducer 10. Sensitivity is also increased by the separation between the crystal sets 30 which increases the hydraulic spring effect.

On the other hand, if the case 12 of the pressure transducer 10 is vibrated or is otherwise accelerated, the rod 56 constrains the crystal sets 30 to move simultaneously and to the same extent. Thus, any strains that are imposed on the crystals 32 and 34 of one of the crystal sets 30 produces equal and opposite strains on the crystals 32 and 34 of the other crystal set 30. Due to the electrical connections between the crystals of the crystal sets 30 as provided by the leads 42 and 44, such outputs are canceling. Thus, the pressure transducer 10 produces no output whatsoever in response to vibrations or other accelerations which may be imposed on the pressure transducer 10.

From the foregoing, it will be understood that in accordance with the present invention, a pressure transducer comprises a rigid case, a damping compound filling the case, and sets of opposed dished crystals mounted within the case and surrounded by the compound. The inner crystals of the sets are interconnected by a rigid rod and both ends of the case are exposed to fluid pressure. The crystals are electrically interconnected in such a way that outputs from the crystals caused by changes in pressure within the case are added whereas outputs from the crystals caused by vibrations or other accelerations are cancelled.

The use of the present invention results in numerous advantages over the prior art. For example, it has been found that by securing the screws that retain the end caps with epoxy or the like, objectionable "noise" outputs from the crystals are eliminated. A more important advantage results from the use of bowed crystals. Previous devices used flat crystals secured by a suitable bonding material. It has been found that such a construction produces a lateral stress which causes resistance to flexing and therefore reduces sensitivity.

Although the preferred embodiment of the invention has been illustrated in the accompanying drawing and described in the foregoing specification, it will be understood that the invention is not limited to the embodiment disclosed, but is capable of rearrangement, modification, and substitution of parts and elements without departing from the spirit of the invention.

What is claimed is:

1. A pressure transducer including:
   a. a housing comprising a cylindrical case and a pair of end caps mounted on the ends of the case and each having an aperture formed through it,
   b. a damping compound filling the housing,
   c. a pair of diaphragms each extending over the aperture in one of the end caps and contacting the compound in the housing,
   d. two sets of piezoelectric crystals mounted at axially spaced points in the housing and each comprising:
      i. inner and outer piezoelectric crystals,
      ii. means separating the centers of the crystals, and
      iii. means maintaining the peripheries of crystals in contact, e. means rigidly interconnecting the two inner crystals;

f. means forming electrical connections between the two outer crystals and the two inner crystals, respectively;

g. a first plurality of resilient nubs secured to the peripheries of the crystals comprising each set for locating the sets radially relative to the housing; and h. a second plurality of resilient nubs secured to the housing on opposite sides of the outer crystals for locating the sets axially relative to the housing.

2. The pressure transducer according to claim 1 wherein the case and the end caps of the housing are formed from an insulating material and further including:

an electrically conductive cylinder positioned within the case;

a pair of electrically conductive washers each securing one of the diaphragms to one of the end caps; and means electrically interconnecting the cylinder and the washer whereby an electrostatic shield is formed around substantially the entire interior of the housing.

3. The pressure transducer according to claim 2 further including means securing the conductive cylinder against movement relative to the case of the housing.

4. The pressure transducer according to claim 3 wherein the means separating the centers of the crystals of each crystal set comprises a metal disk positioned between the crystals and wherein the means maintaining the peripheries of the crystals of each set in contact comprises a ring of nonconductive cement extending around each crystal set.

5. The pressure transducer according to claim 4 further including amplifier means positioned within the housing, means connecting the amplifier means to the electrical connections between the crystals, and electrically conductive means extending from the amplifier means out of the housing.

6. A pressure transducer including:

a. two sets of opposed dished piezoelectric crystals each comprising an inner crystal and an outer crystal, b. a housing enclosing the crystal sets and having opposed openings formed therein, c. means for detachably locating the crystal sets in the housing while permitting relative movement between the peripheries of the crystal sets and the interior of the housing, said locating means comprising resilient means fixed to the housing on opposite sides of the outer crystals and resilient means fixed to the peripheries of the crystal sets, d. means rigidly connecting the inner crystal of one crystal set to the inner crystal of the other crystal set, e. a damping compound filling the housing and surrounding the crystal sets therein, and f. diaphragms enclosing the openings in the housing and contacting the compound.

7. The pressure transducer according to claim 6 wherein each set of opposed dished piezoelectric crystals includes a metal disk positioned between the centers of the crystals and a ring of nonconductive cement extending around the crystal set for maintaining the peripheries of the crystals in contact.

8. The pressure transducer according to claim 7 wherein the crystal sets are mounted at spaced points within the housing and wherein the means rigidly connecting the inner crystals of the sets comprises a rigid member extending between and secured to the two inner crystals.

9. The pressure transducer according to claim 6 wherein the means for locating the crystal sets in the housing comprises a plurality of nubs positioned at spaced points around the peripheries of the crystal sets and a plurality of nubs fixed to the housing on opposite sides of the outer crystals.

10. The pressure transducer according to claim 6 wherein the housing comprises an outer case formed from an electrical insulating material and means forming an electrostatic shield around substantially the entire interior of the case.

11. The pressure transducer according to claim 6 further including means forming an electrical connection between the two outer crystals, means for forming electrical connections between the two inner crystals, and electrically conductive means extending from the electrical connections out of the housing.

* * * * *